(12) United States Patent
Honan et al.

(10) Patent No.: US 7,309,052 B2
(45) Date of Patent: Dec. 18, 2007

(54) ARTICULATED EQUIPMENT SUPPORT ASSEMBLY MOVABLE BETWEEN USE AND NON-USE POSITIONS

(75) Inventors: David M. Honan, Watertown, NY (US); Michael G. Tillman, Chaumont, NY (US)

(73) Assignee: The Stebbins Engineering and Manufacturing Company, Watertown, NY (US)

( * ) Notice: Subject to any disclaimer, the term of this patent is extended or adjusted under 35 U.S.C. 154(b) by 0 days.

(21) Appl. No.: 11/370,100

(22) Filed: Mar. 8, 2006

(65) Prior Publication Data

US 2006/0175526 A1   Aug. 10, 2006

Related U.S. Application Data

(63) Continuation of application No. PCT/US2004/026727, filed on Sep. 8, 2004.

(60) Provisional application No. 60/500,705, filed on Sep. 8, 2003.

(51) Int. Cl.
*E04G 3/00* (2006.01)
(52) U.S. Cl. .................. 248/278.1; 248/276.1
(58) Field of Classification Search ............ 248/276.1, 248/278.1, 183.2, 183.1, 274.1, 122.1, 125.2, 248/126
See application file for complete search history.

(56) References Cited

U.S. PATENT DOCUMENTS

| | | | |
|---|---|---|---|
| 3,080,490 A | | 3/1963 | Newcomb |
| 3,106,425 A | * | 10/1963 | McClintock ........... 297/423.17 |
| 4,140,296 A | * | 2/1979 | Guzman Guillen ......... 248/445 |
| 4,183,489 A | | 1/1980 | Copher et al. |
| 4,590,695 A | | 5/1986 | McGillivray |
| 5,738,322 A | * | 4/1998 | Huang ..................... 248/278.1 |
| 6,669,155 B2 | * | 12/2003 | Ron ........................ 248/276.1 |
| 6,764,055 B1 | * | 7/2004 | Lee ............................ 248/451 |
| 6,786,461 B1 | * | 9/2004 | Tsai et al. ................ 248/118.3 |

OTHER PUBLICATIONS

PCT International Search Report dated Jul. 20, 2005 in application No. PCT/US04/26727, filed Sep. 8, 2004 (1 page).

* cited by examiner

*Primary Examiner*—Gwendolyn Baxter
(74) *Attorney, Agent, or Firm*—Shlesinger, Arkwright & Garvey LLP (57) ABSTRACT

The equipment support may include a first support, an actuator arm on the first support, and a second support supporting a piece of equipment. A third support may be provided between the first support and the second support. The first support may be pivotally attached to a fixed point, which may be distant from the use position of the equipment. The second and third support may be rotatably attached to the first support and may be configured for supporting the equipment at a distance from the fixed point. When the equipment support supports a piece of equipment adjacent a bridge, and is pivotally attached to the ground, the user may stand on the ground, and move, pivot, and rotate the supports for moving the equipment from a distant, use position to an adjacent, non-use position above the ground for servicing.

19 Claims, 11 Drawing Sheets

FIG.11

ARTICULATED EQUIPMENT SUPPORT ASSEMBLY MOVABLE BETWEEN USE AND NON-USE POSITIONS

CROSS-REFERENCE TO RELATED APPLICATION

This application is a continuation of application no. PCT/US2004/026727, filed Sep. 8, 2004, which claims the convention priority of U.S. patent application No. 60/500,705, filed 8 Sep. 2003, each of which is incorporated herein by reference.

FIELD OF THE INVENTION

This invention relates to equipment supports. More particularly, this invention relates to movable equipment supports movable between use and non-use positions. Even more particularly, the invention relates to an articulated equipment support assembly particularly suited for maintaining a piece of equipment in its use or service position adjacent or underneath a bridge, for example, and which equipment support may be moved to a non-use or maintenance position for ease of access in maintaining the piece of supported equipment by a user who is located at a distance from the bridge.

BACKGROUND OF THE INVENTION

Devices for supporting a piece of equipment are known.

However, no equipment support is known which can be operated by a user at a distance from the piece of equipment being supported so that the supported equipment may be moved from a distant supported position to a close position, at which close position the operator may service the piece of equipment.

OBJECTS AND SUMMARY OF THE INVENTION

It is an object of the invention to overcome the drawbacks of prior art devices.

It is a further object of the invention to provide a piece of support equipment which can be moved from a distant, use position to a near, non-use position, without the need for an operator to approach the piece of supported equipment in its distant, use position.

It is yet another object of the invention to provide an articulated equipment assembly particularly suited for use in applications where the equipment being supported is at a distance from a convenient, non-use position in which an operator may work on the equipment.

It is another object of the invention to provide a piece of support equipment movable between use and non-use positions that supports the equipment in its use and non-use positions, as well as intermediate positions during movement between the use and non-use positions.

A further object of the invention is to provide an equipment support which has few moving parts, and is, hence, easy to use and reliable.

In summary, the invention includes an articulated equipment support assembly configured for supporting a piece of equipment in a first, use position, and a second, non-use position distant from the use position. The equipment support is configured for allowing a user to move the equipment from its use position to its non-use position, while the user remain at the non-use position distant from the use position.

The equipment support may include a first support, an actuator arm on the first support, and a second support supporting a piece of equipment. A further, third support may be provided between the first support and the second support. The further, third support may be substantially vertical and the second support may be substantially horizontal. The first support may be substantially horizontal. The first support may be pivotally attached to a substantially fixed point, which may be distant from the use position of the equipment. The second/third support(s) may be rotatably attached to the first support and may be configured for supporting the equipment at a distance from the substantially fixed point.

In the case where the further, third support is provided, the further support may extend in a direction different from the direction of extension of the second support. The different direction may be substantially vertical, and the first and second supports may extend in a substantially horizontal direction. The actuator arm may extend substantially horizontally. A portion of the actuator arm may be provided adjacent a point at which a user may operate the actuator arm distant from the use position of the supported equipment.

For example, the user may stand on the ground or other surface adjacent to, but at a distance from, a bridge. A piece of equipment may be supported adjacent to the bridge. The equipment support may include a main, substantially horizontal support pivotally attached to the ground, and a substantially horizontal equipment support supporting the equipment adjacent to the bridge. A vertical support may extend between the equipment support and the main support. An actuator arm may be provided on the vertical support. The vertical support may be rotatably attached to the main support. The actuator arm may be configured for rotating the equipment into and out of position adjacent to the bridge. In use, when the equipment is to be serviced, the equipment may be moved away from its use position by use of the actuator arm, then the equipment support may be pivoted relative to the ground by pivoting the main support; and then the equipment may be further rotated into a final, service position adjacent to the user. Mechanical assists, such as a cable drum, may be provided for pivoting the main support for raising and lowering the entire equipment support.

It should be understood that relative terms such as up, down, left, and right are for convenience only, and are not intended to be limiting.

DETAILED DESCRIPTION OF THE INVENTION

FIGS. 1-10 illustrate an embodiment of an articulated equipment support assembly 4 according to the invention.

Equipment support 4 may include a mounting flange 10 for securing support assembly 4 to a wall W, for example.

Mounting flange 10 may include fasteners 12 and a mounting plate 14, for example.

Equipment support 4 may further include a hinge assembly 20 including a pin 24, which hinge assembly 20 movably attaches a support tube or first support 30 to wall W. Support tube 30 may include a rotating side or end 34 and a fixed side or end 32.

A rotary flange 40 may be provided for securing rotating side or portion 34 to fixed side or portion 32. By use of rotary flange 40 having connectors 44, such as detachably attached bolts, rotary flange 40 may prevent rotary movement about a longitudinal axis of support tube 30 when bolts 44 are in place in flange 40, or flange 40 may provide for rotary movement of rotating side 34 relative to fixed side 32 when fasteners 44 have been removed, as will be described further below.

A strut or support 50 may be provided between support 30 and wall W. An end plate 52 may be provided on a lower portion of support 50 for abutting wall W when a piece of equipment E, such as a sensor, is in place adjacent an object, such as a bridge B, adjacent to which the user wants to place equipment E. Support 50 may rest against wall W, depending on the intended use.

A vertical support or third support 60 may be provided, such as the illustrated tube. An upper bearing 62 and a lower bearing 64 may be provided for rotatably securing support 60 to support 30. Bearings 62 and 64 may be selected so that the disposition of support 60 along its length relative to support 30 may be varied, and then fixed by use of bearings 62, 64, for example. An actuator or arm 70, such as the illustrated half wheel, may be provided above support 30. Half wheel 70 may include one or more spokes 72 and a hinge 74. Hinge 74 may be provided for moveably securing a left side 76 to a right side 78 of actuator 70.

To assist in moving support 30 about hinge assembly 20, a cable drum 80 or other mechanism for providing a mechanical advantage may be provided. In the case of a cable drum 80, a crank arm 82 may be provided for rotating a drum 84, so that a cable 86 may be wound and unwound on to drum 84 in a direction 88 depending on whether the user wishes to move support 60, for example, upwardly or downwardly, respectively. This will be described further below.

A further support, such as a horizontal support or a second support 90, which may be in the form of a tube, may be provided on vertical support 60, for example, in the case where equipment E is to be located or serviced, or both, in a location offset from vertical tube 60. As shown in FIGS. 1-10, and in FIG. 7, for example, in the case where equipment E is provided adjacent bridge B in a service position, support 90 locates equipment E adjacent bridge B while vertical support 60 and the remainder of equipment support 4 is offset from bridge B.

Figure 7:
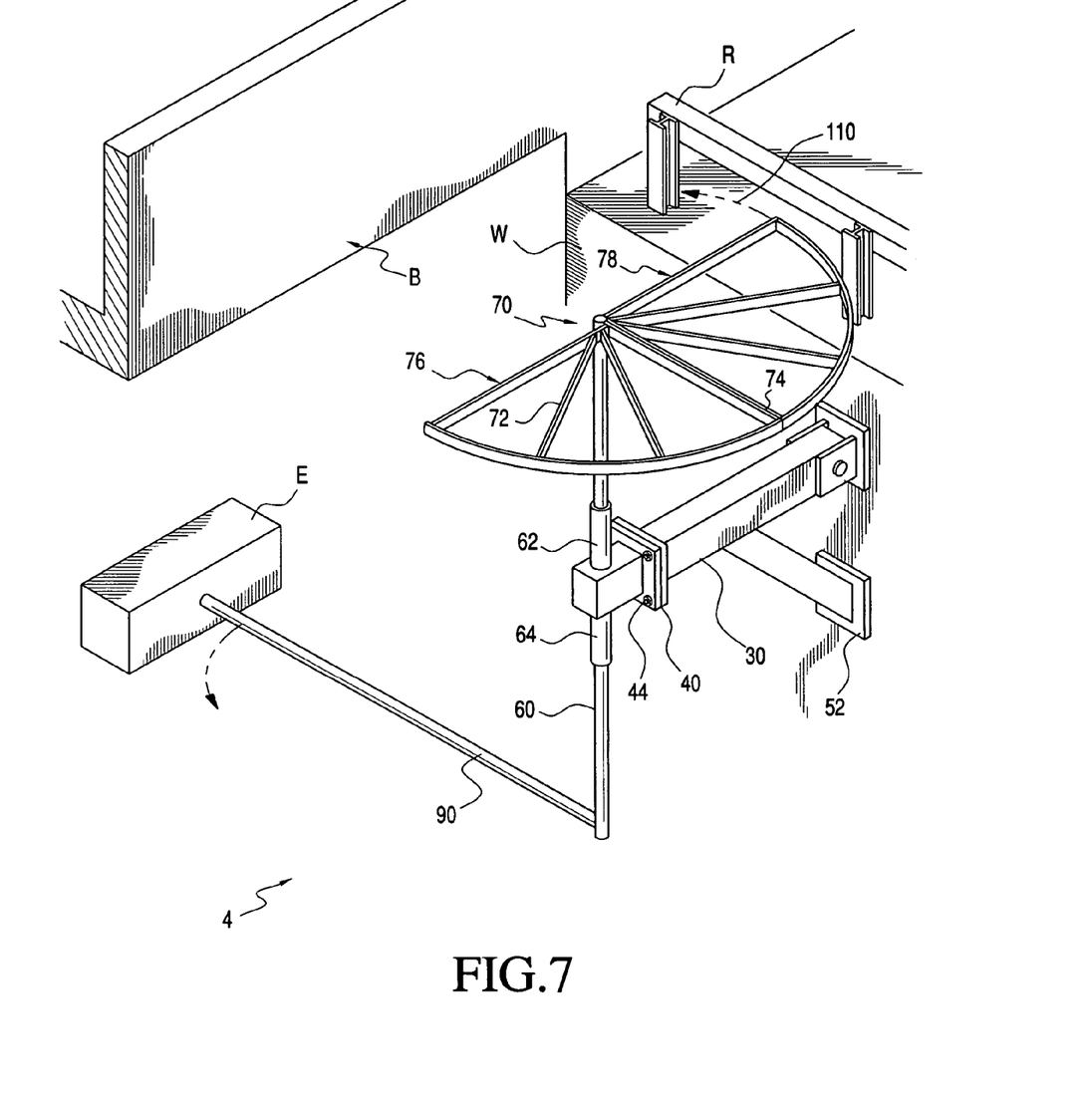
FIG. 7 is a front perspective view of the embodiment of FIG. 1 showing the equipment support in its service or use position.

FIG. 7 likewise shows a rail R, such as a guardrail, disposed above wall W.

Figure 10:
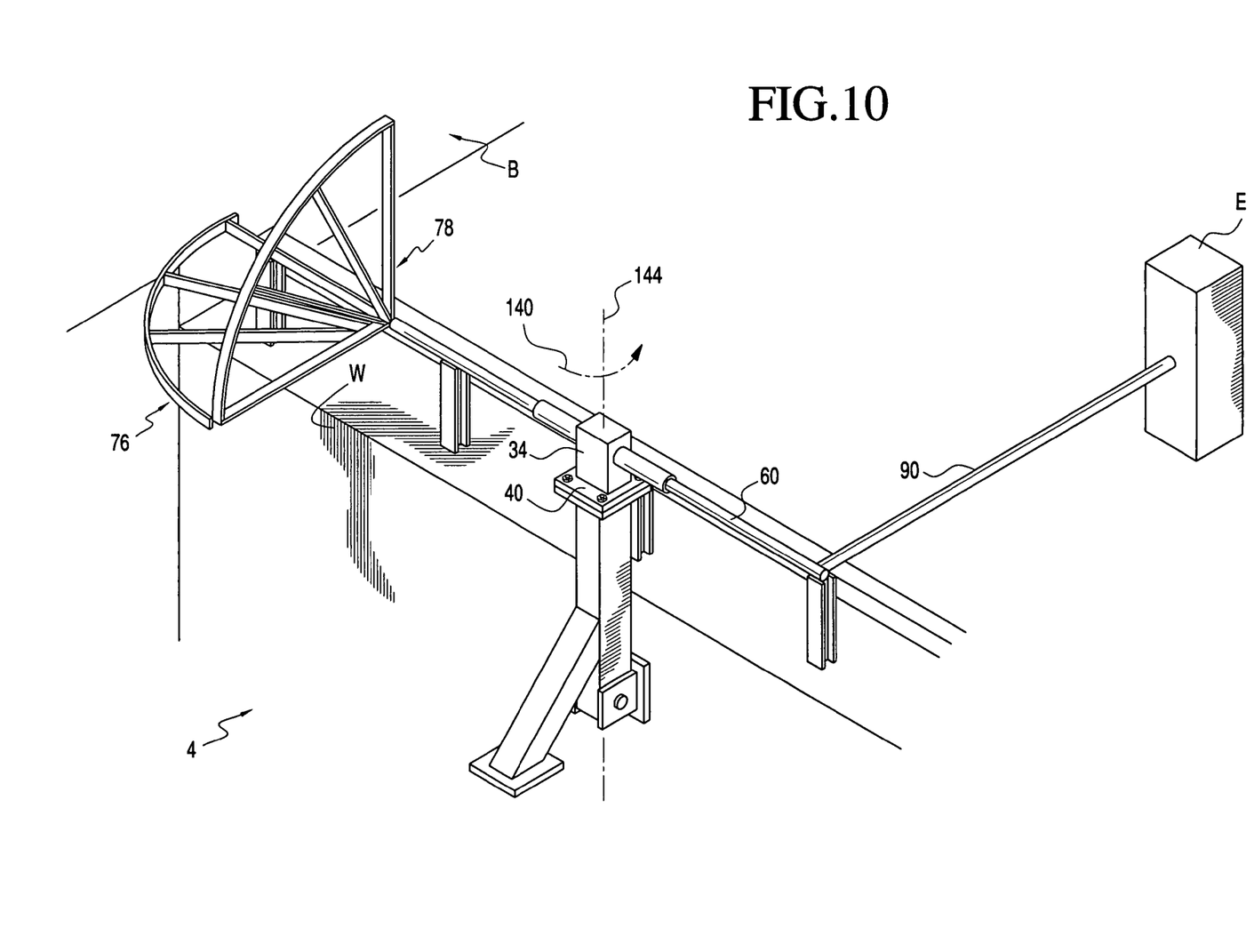
FIG. 10 is a front perspective view of the third step (step 3) showing the movement of the embodiment of FIG. 1 from its service position to its maintenance position.

In use, when equipment E is to be moved from its service or use position of FIG. 7 to its maintenance or non-use position of FIG. 10, the following illustrative steps 1-3 may be taken. Steps 1-3 are merely examples of steps at which different substeps begin and end, depending on one's point of view, and a number of movements or submovements in between the illustrated steps 1-3 are possible. Unillustrated substeps or movements of assembly 4, for example, through space, while equipment E is moved from a use to a non-use position, and vice-versa, will be readily apparent to a person having ordinary skill in the art.

The order of the illustrated and unillustrated steps may be varied, depending on the intended use, as will be readily appreciated.

For discussion purposes, FIGS. 7-10 will be discussed regarding steps 1-3, although associated ones of FIGS. 1-6 correspond to FIGS. 7-10, as described above, and as will be readily apparent.

FIG. 7 illustrates equipment support 4 with parts, such as cable drum 80, omitted, for ease of understanding.

In the FIG. 7 service or use position, one or more of the movable parts, such as actuator arm 70 may be secured so as to prevent unauthorized movement of equipment E from its service or use position. In the case where actuator arm 70 is locked in place by an unillustrated lock, such a lock will be unlocked by service personnel prior to movement of equipment support 4 from its service position to step 1, for example.

Figure 8:
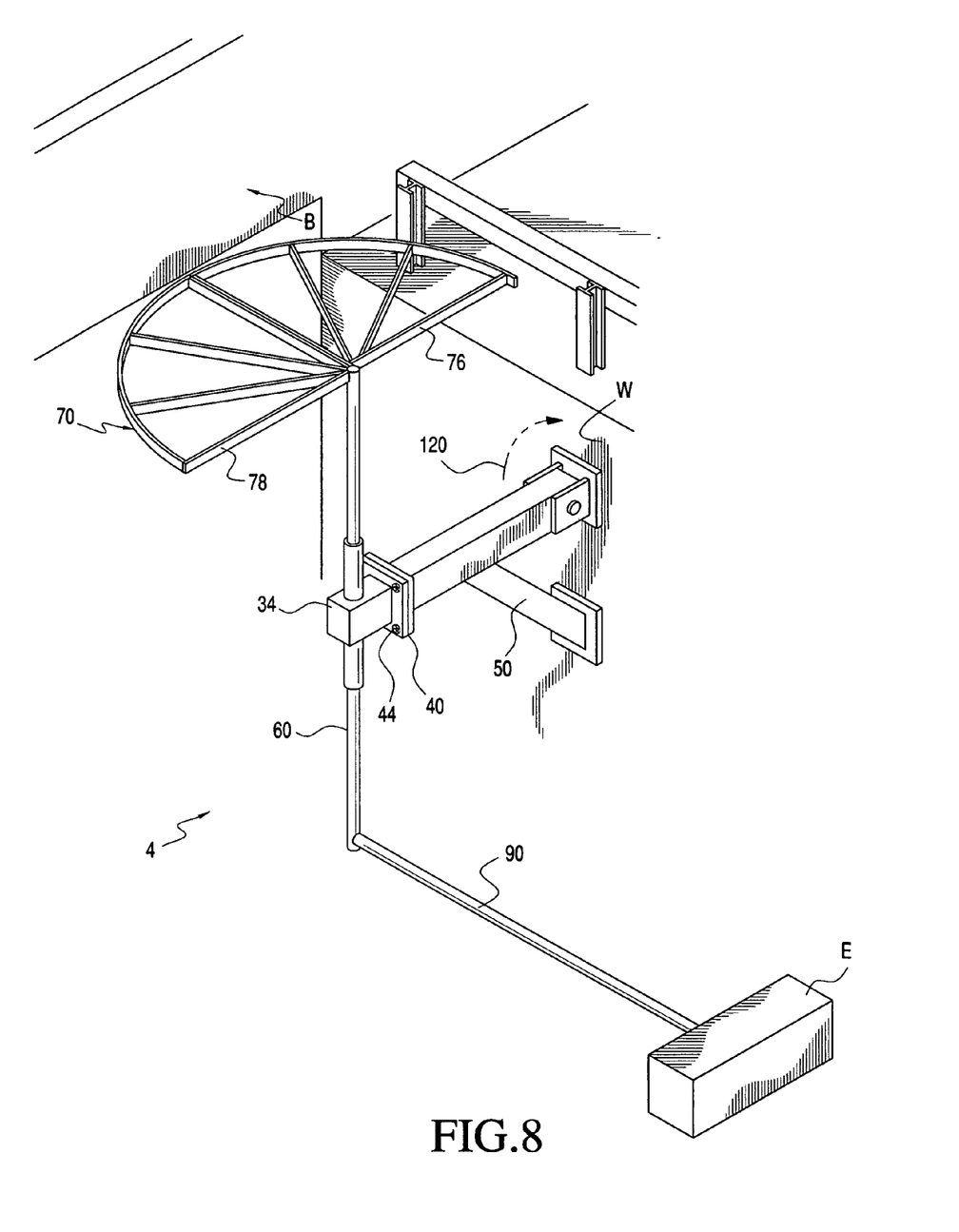
FIG. 8 is a front perspective view of the embodiment of FIG. 1 showing the first step (step 1) of moving the support equipment from its service to its maintenance position.

Step 1 of FIG. 8 shows how support arm or actuator 70 has been rotated counterclockwise in the direction of arrow 110, for example, as viewed in FIG. 7, so that equipment E is moved away from bridge B as shown in FIG. 7 to step 1 position of FIG. 8. Rotation of support arm 70 rotates vertical support 60 within bearings 62 and 64, as will be appreciated. The rotation may be termed rotation of third support 60 about a first axis.

Figure 4:
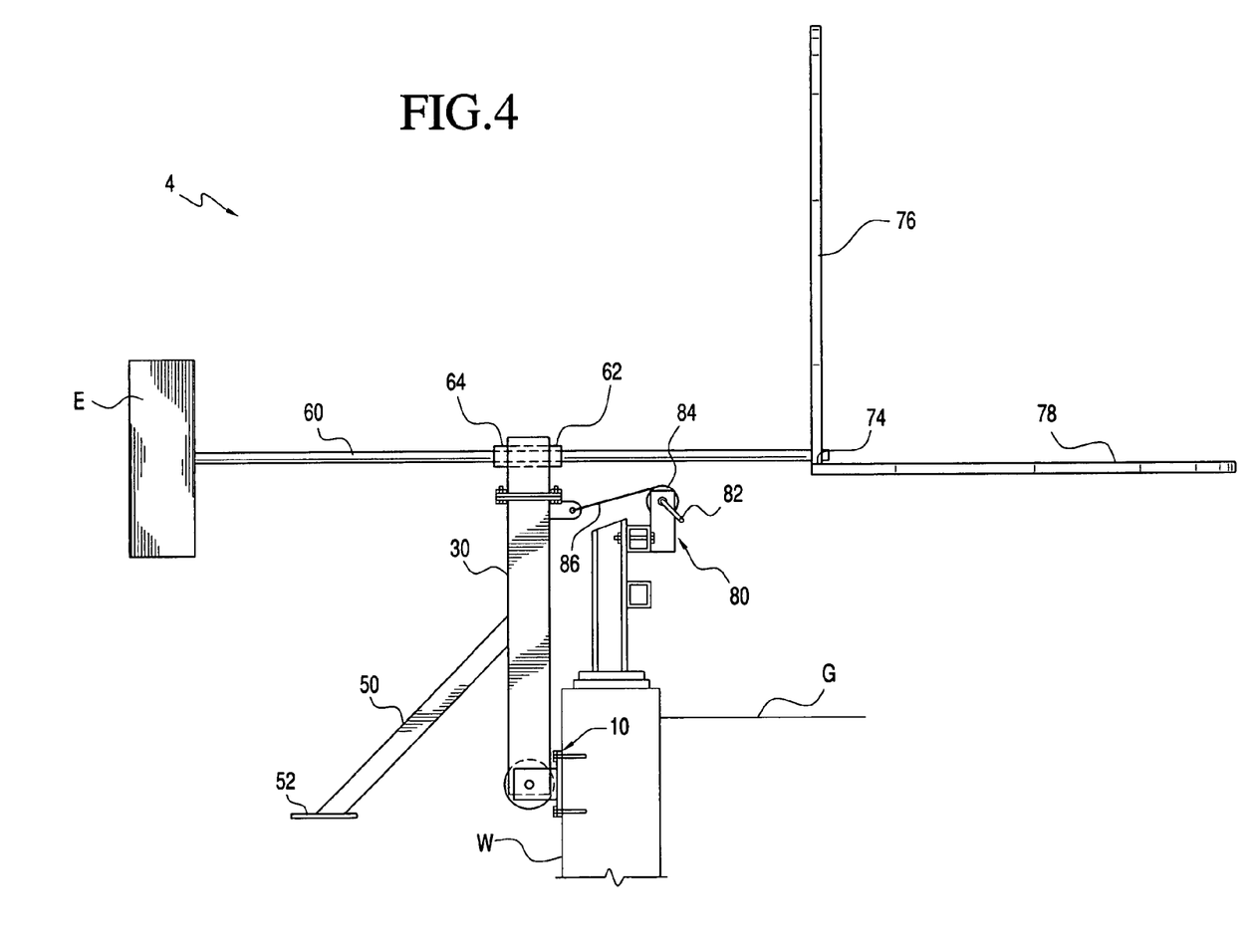
FIG. 4 is a side elevational view of the embodiment of FIG. 1 showing a second step (step 2) of the steps taken to move the support equipment from a service or use position to a maintenance or non-use position.
Figure 5:
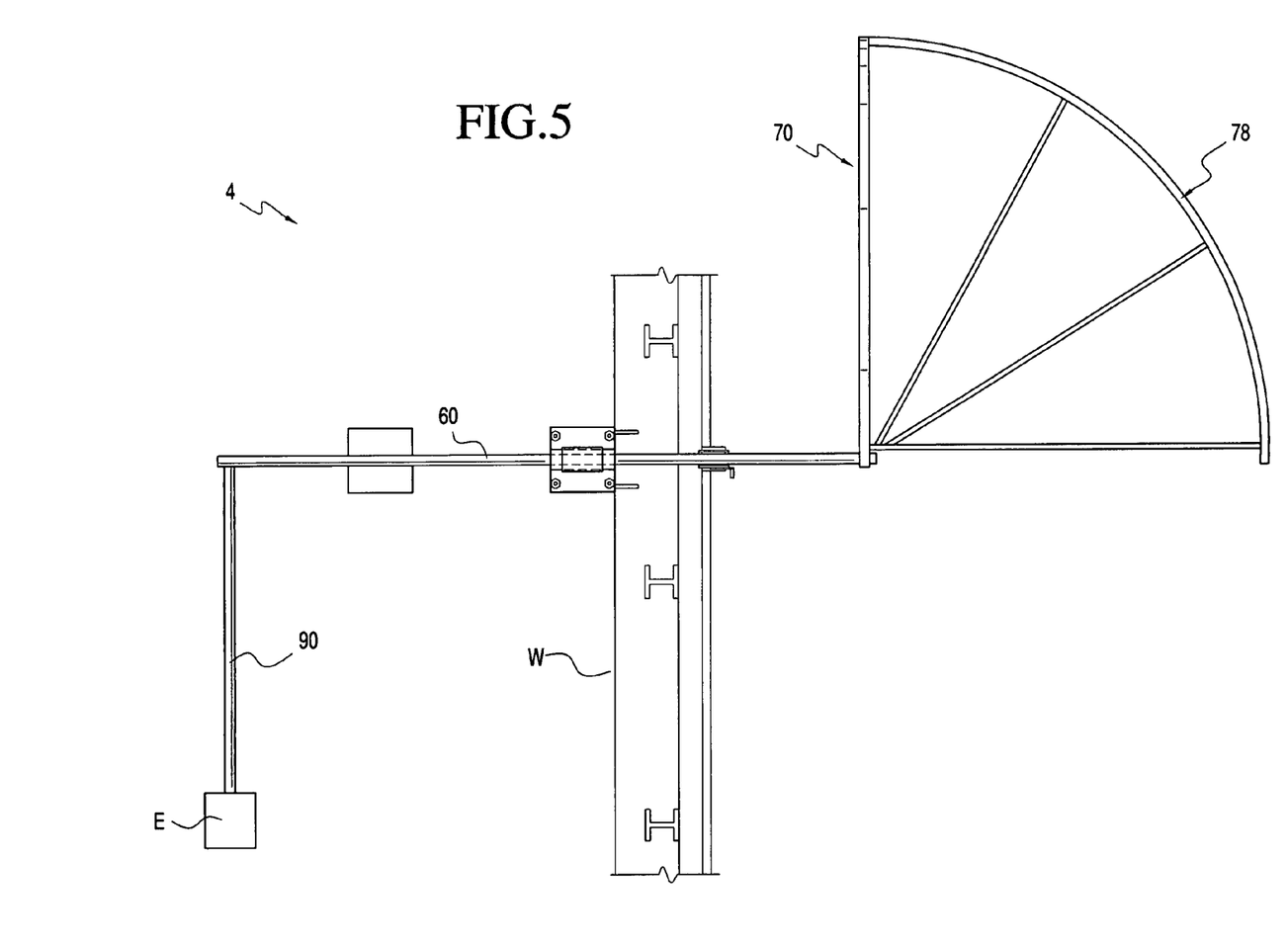
FIG. 5 is a top plan view of the second step of FIG. 4 of the steps taken in moving the equipment support from a service position to a maintenance position.
Figure 6:
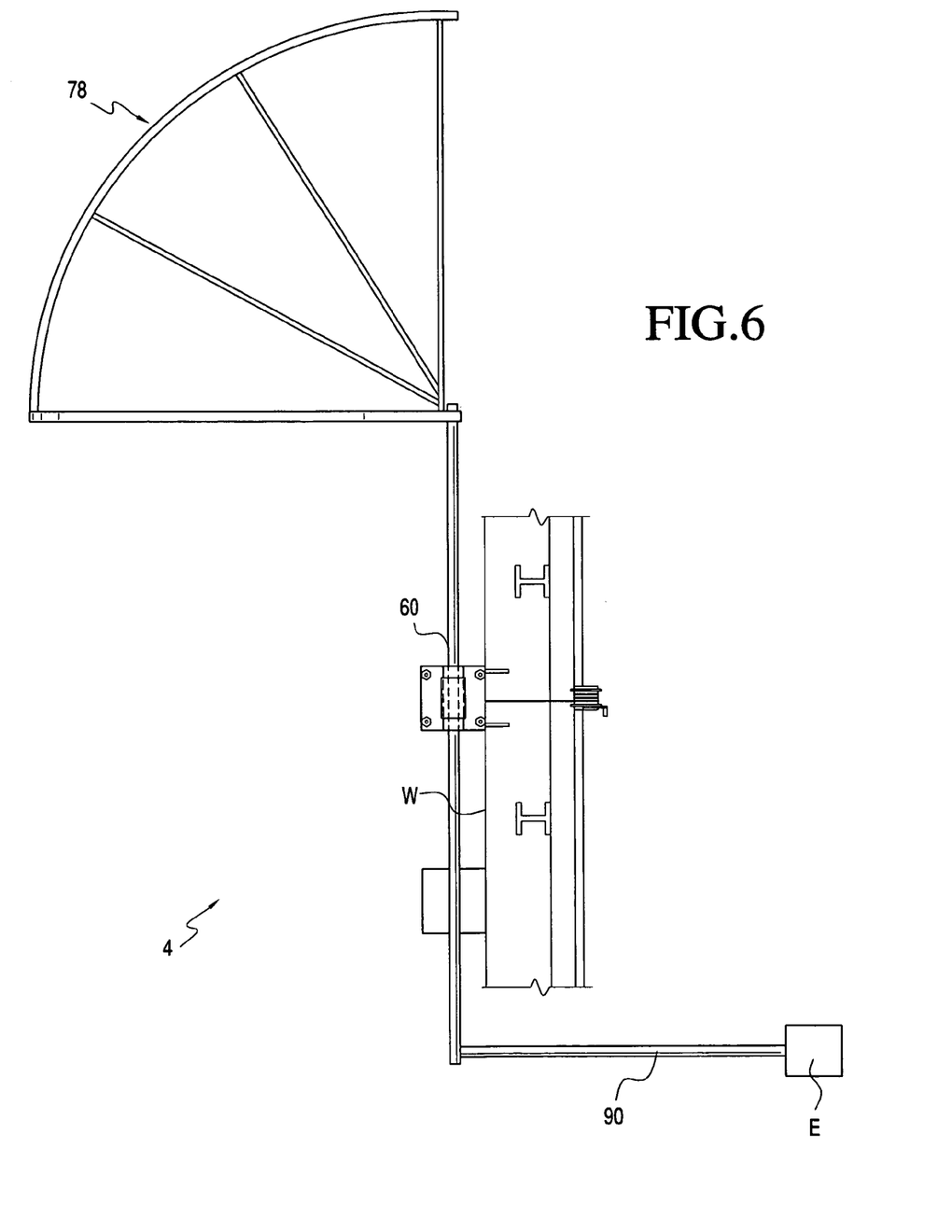
FIG. 6 is a top plan view of a third step (step 3) in the steps taken in moving the equipment support of FIG. 1 from a service position to its maintenance position.
Figure 9:
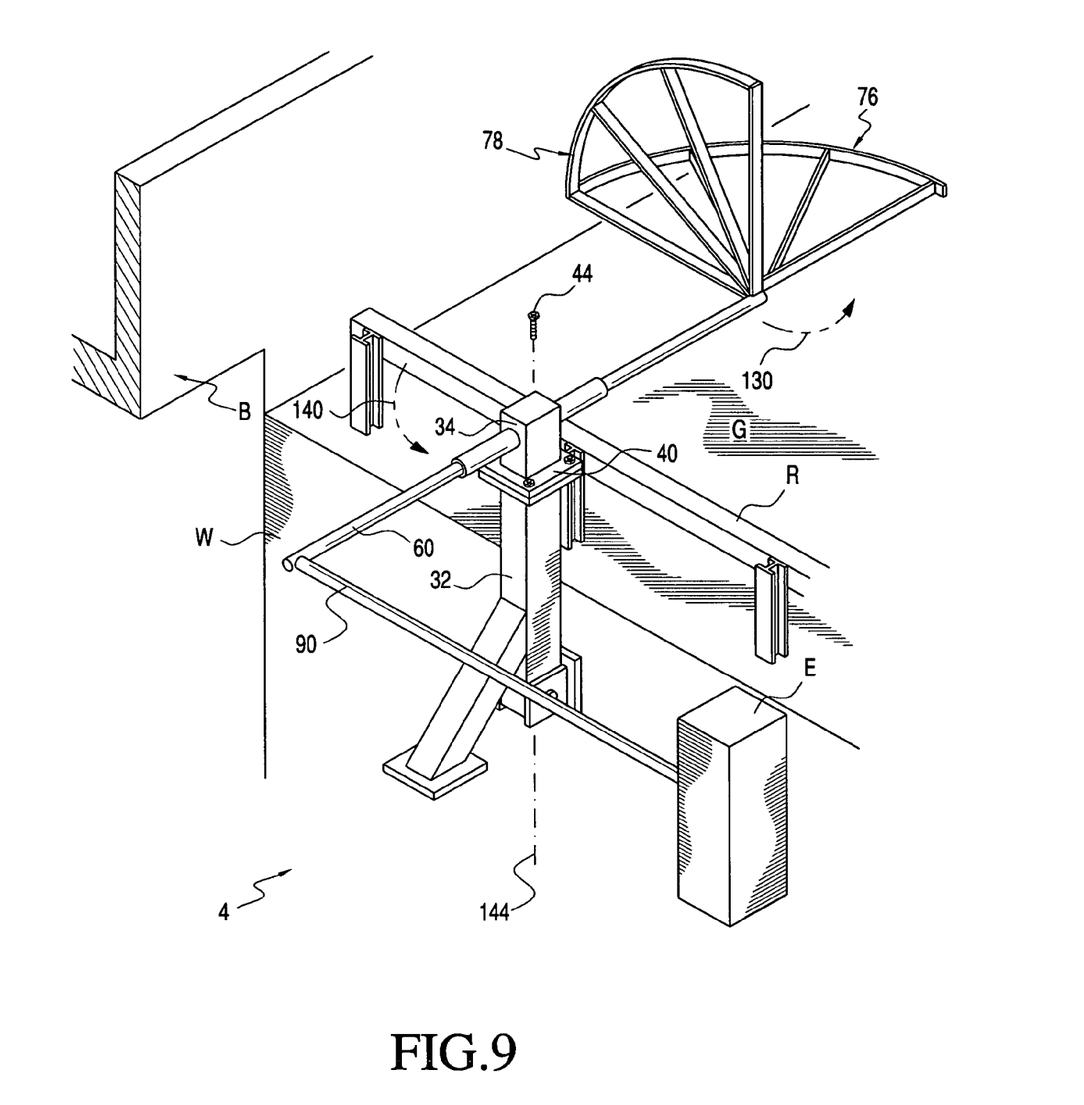
FIG. 9 is a front perspective view showing the second step (step 2) of moving the equipment support from its service position to its maintenance position.

The user may then pivot support 40 in a clockwise direction in the direction of arrow 120, as viewed in FIG. 8, so that support 50 moves away from wall W and vertical support 60 assumes a substantially horizontal position as shown in the illustrative step 2 of FIG. 9. In other words, so that actuator 70 moves toward, and past, guardrail R, for example. FIG. 4 is a side elevational view of FIG. 9, which FIG. 9 likewise omits some optional components.

In moving from step 1 to step 2, i.e., from FIG. 8 to FIG. 9, as shown, the user may move left side 76 of half wheel 70 upwardly about hinge 74, in the direction of arrow 130, as shown in FIG. 9, in the case where left side 76 is sufficiently long that it might interfere with the ground G or rail R, for example, when vertical support 60 is in the illustrated substantially horizontal position of FIG. 9.

In order to move from step 2 to step 3, i.e., from the position of FIG. 9 to the position of FIG. 10, fasteners 44 or other securing elements, may first be sufficiently detached or disengaged from rotary flange 40 (as shown in FIG. 9) so that rotary flange 40 is able to rotate and allow rotating side 34 of support 30 to rotate relative to fixed side 32. Such rotation, e.g., in the direction of arrow 140, allows the user to rotate rotatable side 34 about a substantially vertical axis 144, as shown in FIGS. 9 and 10, so that rotatable side 34 and, hence, support 60 may be moved from the position of step 2 (FIG. 9) to the position of step 3 (FIG. 10). This rotation of support 60 may be termed rotation about a second axis extending coaxially with or substantially parallel to the longitudinal axis of first support 30.

Step 3 may be termed a maintenance or non-use position in which the equipment E may be serviced by personnel.

It should be appreciated that users of equipment support 4 have thus moved equipment E from a distant, service position to a close, maintenance position without the need to approach equipment E. After all illustrative steps have been taken, service personnel are adjacent equipment E, the service personnel having remained at a distance from the service or use position of equipment E (FIGS. 1, 2 and 7) throughout the illustrated steps of FIGS. 7-9.

After servicing has been completed, it should be appreciated that equipment E may be returned to its service position (FIGS. 1, 2, and 7) by reversing the order of the steps.

Figure 1:
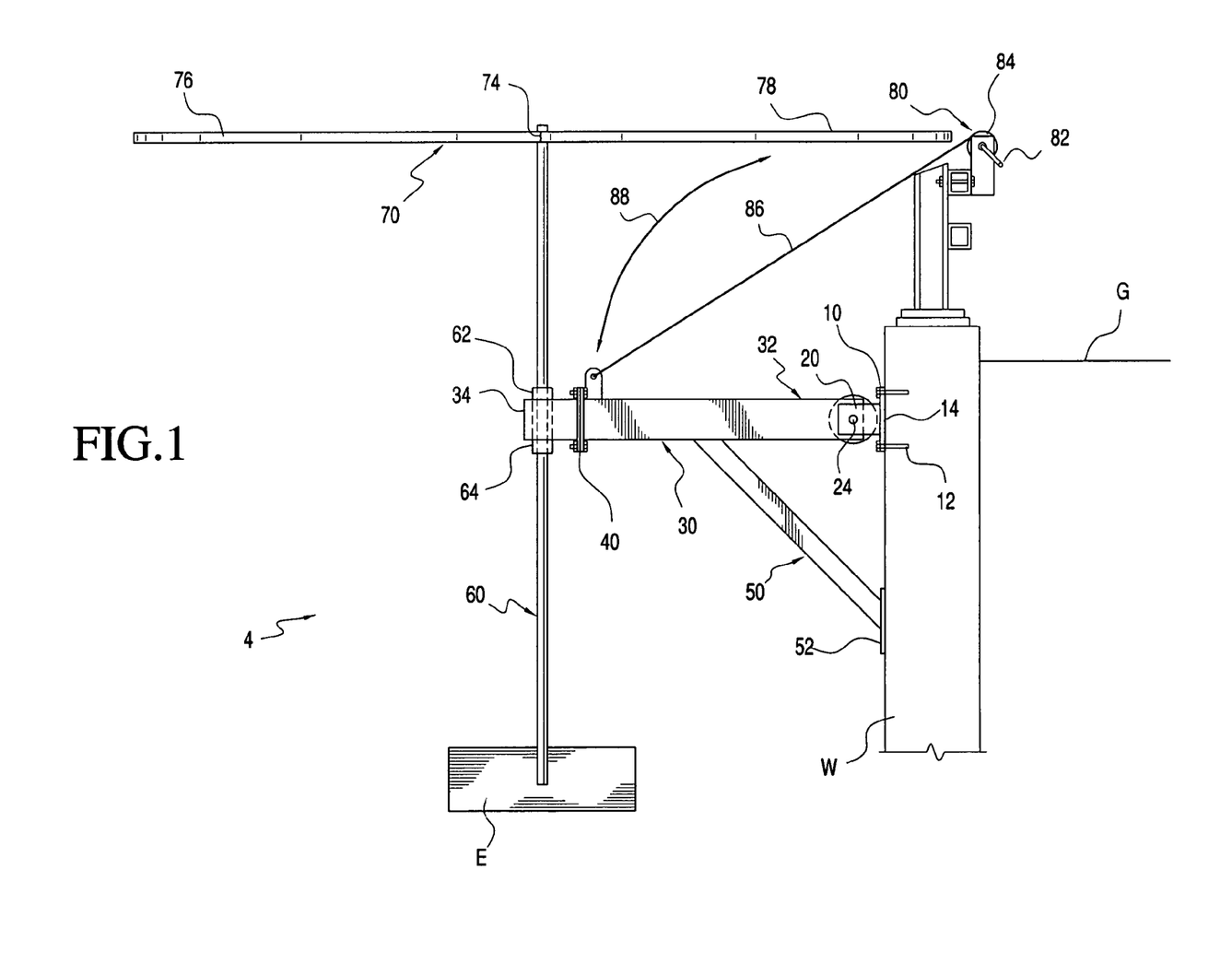
FIG. 1 is a side view of the articulated support assembly in a service or use position according to an embodiment of an invention.
Figure 2:
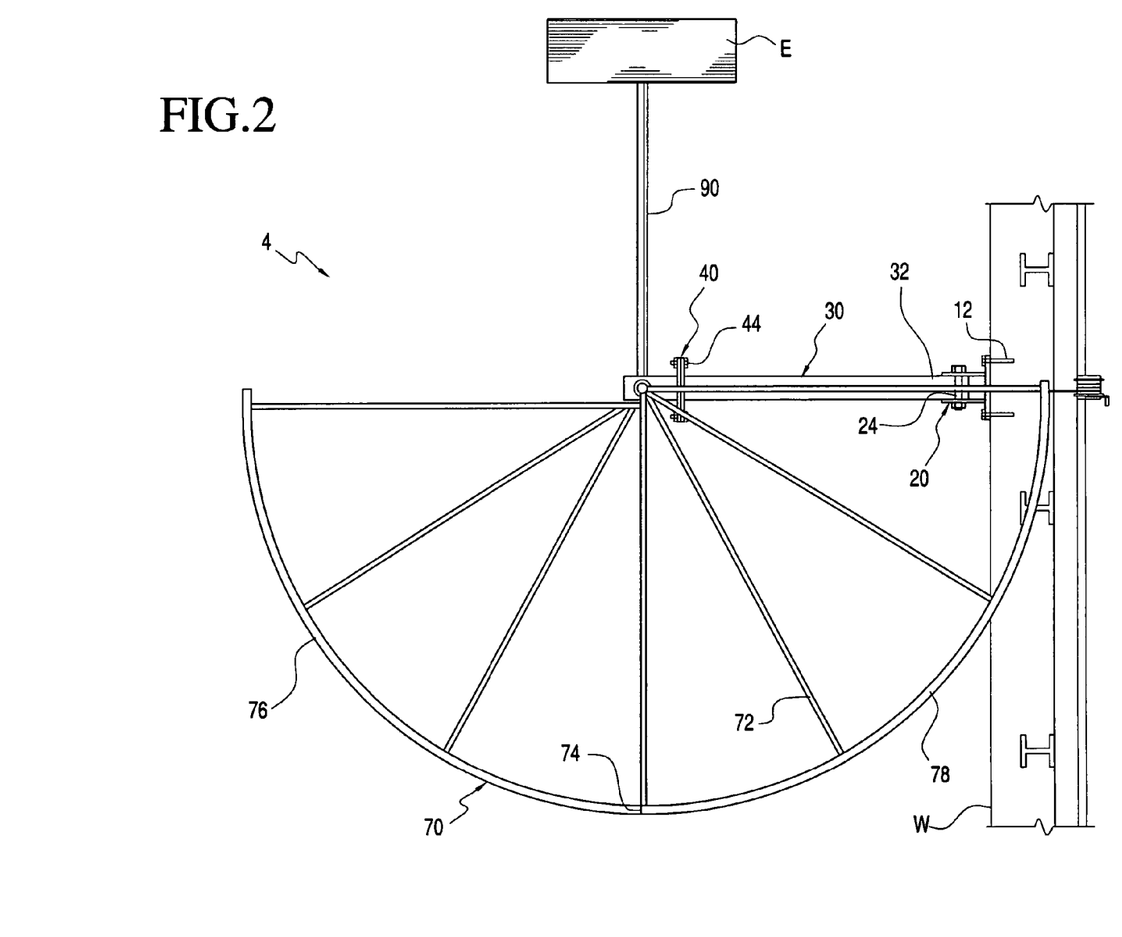
FIG. 2 is a top plan view of the equipment support of the embodiment of FIG. 1 in a service or use position.
Figure 3:
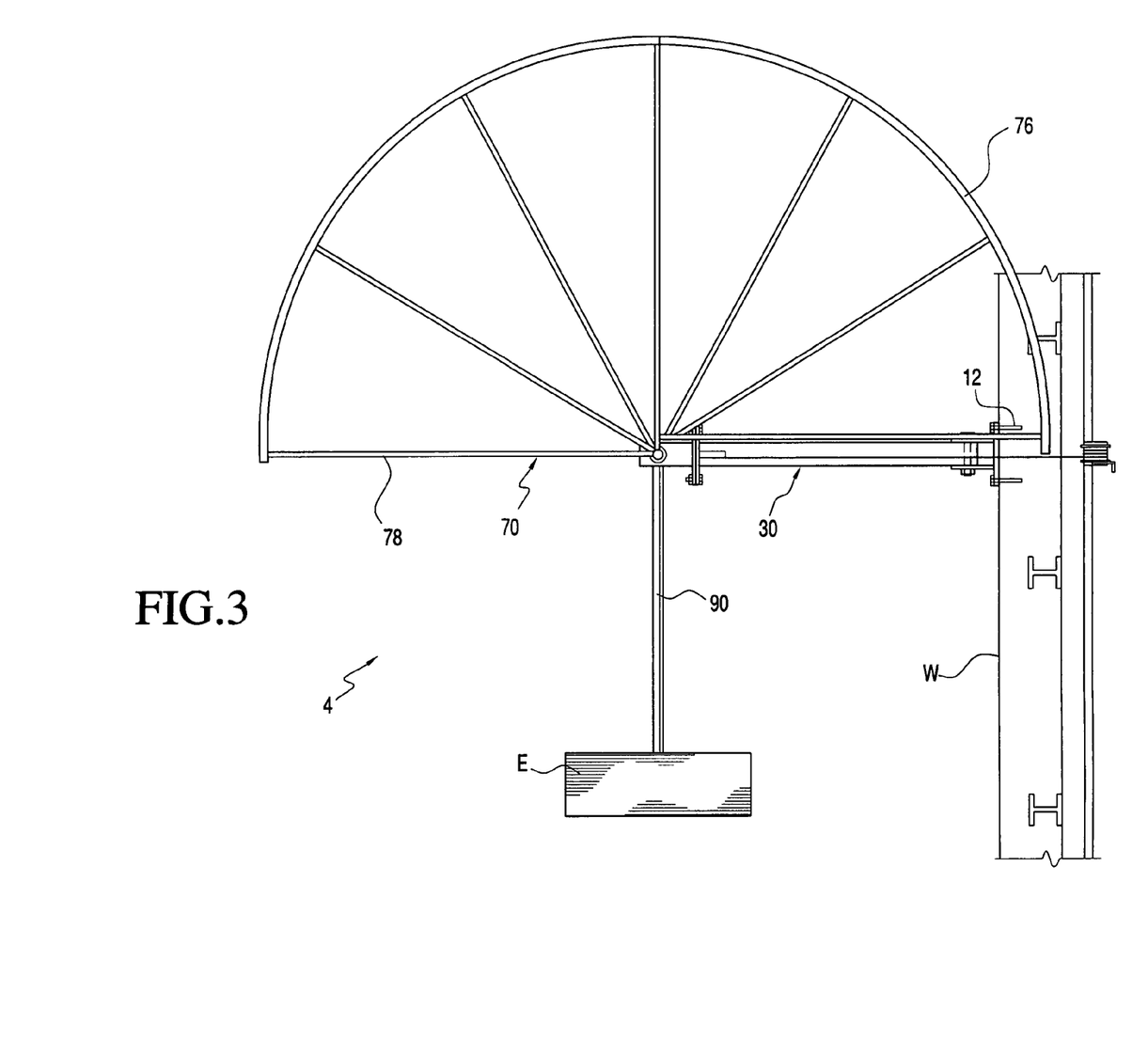
FIG. 3 is a top plan view of the equipment support according to FIG. 1 showing a first step (step 1) of steps taken to move the equipment support from a service or use position to a maintenance or non-use position.
Figure 11:
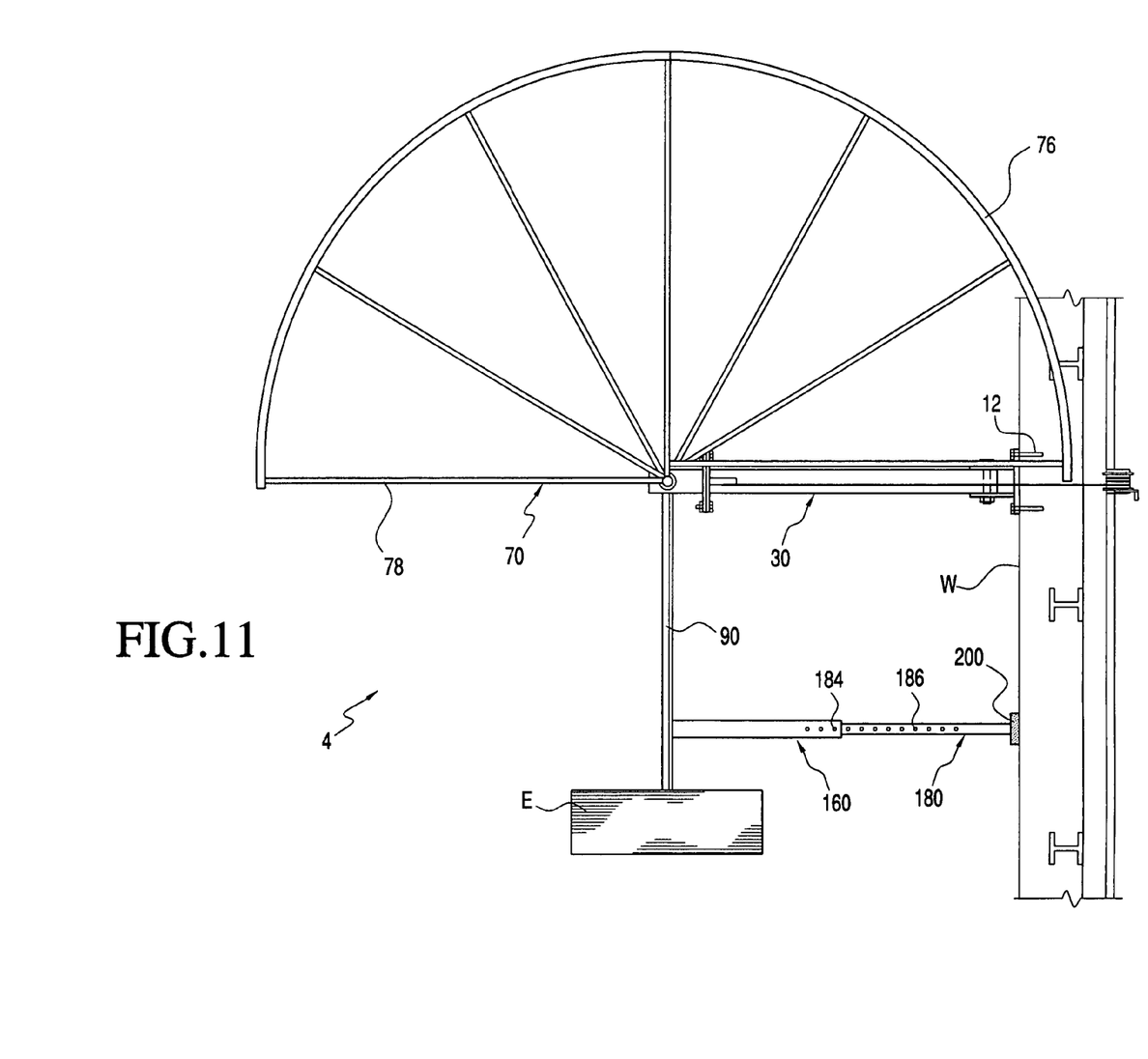
FIG. 11 is a top plan view of a further embodiment of an articulated equipment support assembly according to the invention, in a view similar to the view of FIG. 3.

FIG. 11 illustrates a further embodiment of an articulated equipment support assembly according to the invention, shown in the manner similar to the FIG. 3 of the above-described embodiment.

The FIG. 11 embodiment includes additional stabilizing features, such as a stabilizing support 160 which may extend substantially between second support 90 and wall W. Stabilizing support 160 may be adjustable for accommodating different distances between support arm 90 and wall W, and for other requirements, as will be readily appreciated. The adjustability of support 160 may include an adjustable extension 180 movable relative to 160. For example, adjustable element 180 may be received within 160. Adjustment holes 184 may be provided in support 160 and respective adjustment holes or other adjustment elements 186 may be provided on adjustment 180 for varying the effective length of 160 and, hence, the distance between support 90 and wall W.

It will be appreciated that, in use, this further support 160 assists in stabilizing support 90 and, thus, supported piece of equipment E in its use position relative to wall W and the remainder of the articulated support assembly.

In addition, a shock absorbing or damping element 200 may be provided between support arm 90 and wall W. For example, the shock or vibration absorbing element 200 may be in the form of a rubber base 200 disposed between adjustment element 180 and wall W. Rubber base 200 may likewise serve to restrict or prevent relative movement between support arm 90 and wall W and, hence, between equipment E and wall W.

In use, the operation of the embodiment of FIG. 11 will be similar to the operation of the embodiment of FIGS. 1-10, as will be readily appreciated.

It will be emphasized that the steps and the order of the steps are merely examples of steps which may be taken in accordance with the invention. Depending on the maintenance and service positions, the order of the steps may be varied, and additional or fewer steps may be taken depending on the intended use.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed:

1. Equipment support, comprising:
   a) an articulated equipment support assembly configured for supporting a piece of equipment in a first, use position, and for supporting the piece of equipment in a second, non-use position, the non-use position being distant from the use position;
   b) the articulated equipment support assembly including:
      i) a first support, the first support having a longitudinal axis and being pivotably attachable to an object;
      ii) a second support, the second support being configured for supporting the piece of equipment;
      iii) a third support, the third support extending between the first support and the second support, and the third support extending transversely relative to the first support and the second support;
      iv) the third support being rotatably attached to the first support for rotation about a first axis, the first axis extending transversely to the longitudinal axis of the first support;
      v) the third support being rotatable about a second axis, the second axis extending transversely relative to the first axis;
      vi) an actuator provided on the third support, the actuator being configured for rotating the third support about the first axis;
      vii) the second axis extending substantially parallel to the longitudinal axis of the first support;
      viii) an engagement element provided adjacent the third support and the first support for allowing and preventing rotary movement of the third support about the second axis;
      ix) a portion of the second support being configured for supporting the piece of equipment, in use, in both its use and non-use positions; and
      x) the first, second, and third supports being configured so that, in use, when the piece of equipment is to be moved from the use position distant from a pivotable attachment of the first support on the object to the non-use position closer to the object to which the first support is pivotably attached, in use, then the user actuates the actuator and rotates the third support about the first axis and rotates both the third support and the second support relative to the first support, then the user pivots the first support about its pivotable attachment for movement relative to the object to which it is attached, then the third support is rotated about the second axis for moving the piece of equipment into the non-use position.

2. Equipment support as in claim 1, wherein:
   a) the actuator includes a portion of a wheel.

3. Equipment support as in claim 2, wherein:
   a) the portion of the wheel includes a first half and
   b) second half hingedly attached to the first half.

4. Equipment support as in claim 1, wherein:
   a) the first support includes a rotating portion and a fixed portion, the rotating portion being rotatable relative to the fixed portion about the longitudinal axis of the first support, and the fixed portion including a pivotable attachment for pivotably attaching the first support to the object.

5. Equipment support as in claim 1, wherein:
a) a strut is provided on the first support, and the strut is configured for engaging the object to which the first support is pivotably attached, when the piece of equipment is in its use position.

6. Equipment support as in claim 1, wherein:
a) a mechanical assist is provided adjacent the first support, the mechanical assist being configured for assisting in pivoting the first support relative to the object to which the first support is pivotably attached.

7. Equipment support as in claim 6, wherein:
a) the mechanical assist includes a cable drum locatable on the object to which the first support is pivotably attached, and a cable; and
b) the cable extends from the drum to a location on the first support.

8. Equipment support as in claim 1, wherein:
a) the third support is detachably fixed relative to the first support so that the location of the third support relative to the first support may be varied, so that the location of the second support relative to the first support may be varied.

9. Equipment support, comprising:
a) an articulated equipment support assembly configured for supporting a piece of equipment in a first, use position, and for supporting the piece of equipment in a second, non-use position, the nonuse position being distant from the use position;
b) the articulated equipment support assembly including:
   i) a first support, the first support having a longitudinal axis and being pivotably attachable to an object;
   ii) a second support, the second support being configured for supporting the piece of equipment;
   iii) a third support, the third support extending between the first support and the second support, and the third support extending transversely relative to the first support and the second support;
   iv) the third support being rotatably attached to the first support for rotation about a first axis, the first axis extending transversely to the longitudinal axis of the first support;
   v) the third support being rotatable about a second axis, the second axis extending transversely relative to the first axis;
   vi) an actuator provided on the third support, the actuator being configured for rotating the third support about the first axis;
   vii) the first support including a rotating portion and a fixed portion, the rotating portion being rotatable relative to the fixed portion about the longitudinal axis of the first support, and the fixed portion including a pivotable attachment for pivotably attaching the first support to the object;
   viii) a rotary flange provided between the rotating portion and the fixed portion of the first support;
   ix) a portion of the second support being configured for supporting the piece of equipment, in use, in both its use and non-use positions; and
   x) the first, second, and third supports being configured so that, in use, when the piece of equipment is to be moved from the use position distant from the pivotable attachment of the first support on the object to a non-use position closer to the object to which the first support is pivotably attached, in use, then the user actuates the actuator and rotates the third support about the first axis and rotates both the third support and the second support relative to the first support, then the user pivots the first support about its pivotable attachment for movement relative to the object to which it is attached, then the third support is rotated about the second axis for moving the piece of equipment into the non-use position.

10. Equipment support as in claim 9, wherein:
a) the second axis extends substantially parallel to the longitudinal axis of the first support.

11. Equipment support as in claim 9, wherein:
a) an engagement element is provided adjacent the third support and the first support for allowing and preventing rotary movement of the third support about the second axis.

12. Equipment support, comprising:
a) an articulated equipment support assembly configured for supporting a piece of equipment in a first, use position, and for supporting a piece of equipment in a second, non-use position, the non-use position being distant from the use position;
b) the articulated equipment support assembly including:
   i) a first support, the first support having a longitudinal axis and being pivotably attachable to an object;
   ii) a second support, the second support being configured for supporting the piece of equipment;
   iii) a third support, the third support extending between the first support and the second support, and the third support extending transversely relative to the first support and the second support;
   iv) the third support being rotatably attached to the first support for rotation about a first axis, the first axis extending transversely to the longitudinal axis of the first support;
   v) the third support being rotatable about a second axis, the second axis extending transversely relative to the first axis;
   vi) an actuator provided on the third support, the actuator being configured for rotating the third support about the first axis;
   vii) the third support being detachably fixed relative to the first support so that the location of the third support relative to the first support may be varied, so that the location of the second support relative to the first support may be varied;
   viii) a portion of the second support being configured for supporting the piece of equipment, in use, in both its use and non-use positions; and
   ix) the first, second, and third supports being configured so that, in use, when the piece of equipment is to be moved from the use position distant from a pivotable attachment of the first support on the object to the non-use position closer to the object to which the first support is pivotably attached, in use, then the user actuates the actuator and rotates the third support about the first axis and rotates both the third support and the second support relative to the first support, then the user pivots the first support about its pivotable attachment for movement relative to the object to which it is attached, then the third support is rotated about the second axis for moving the piece of equipment into the non-use position.

13. Equipment support as in claim 12, wherein:
a) the second axis extends transverse to the longitudinal axis of the first support.

14. Equipment support as in claim 13, wherein:
a) an engagement element is provided adjacent the third support and the first support for allowing and preventing rotary movement of the third support about the second axis.

15. Equipment support as in claim 12, wherein:
a) an engagement element is provided adjacent the third support and the first support for allowing and preventing rotary movement of the third support about the second axis.

16. Equipment support as in claim 12, wherein:
a) the actuator includes a portion of a wheel.

17. Equipment support as in claim 16, wherein:
a) the portion of the wheel includes a first half and a second half hingedly attached to the first half.

18. Equipment support as in claim 16, wherein:
a) an engagement element is provided adjacent the third support and the first support for allowing and preventing rotary movement of the third support about the second axis.

19. Equipment support as in claim 12, wherein:
a) a mechanical assist is provided adjacent the first support, the mechanical assist being configured for assisting in pivoting the first support relative to the object to which the first support is pivotably attached.

* * * * *